US010261203B2

(12) United States Patent
Oukili et al.

(10) Patent No.: US 10,261,203 B2
(45) Date of Patent: Apr. 16, 2019

(54) MIGRATING A HORIZONTAL COMPONENT OF A WAVEFIELD

(71) Applicant: PGS Geophysical AS, Oslo (NO)

(72) Inventors: Julien Oukili, Oslo (NO); Grunde Rønholt, Oslo (NO)

(73) Assignee: PGS Geophysical AS, Oslo (NO)

( * ) Notice: Subject to any disclaimer, the term of this patent is extended or adjusted under 35 U.S.C. 154(b) by 57 days.

(21) Appl. No.: 15/428,332

(22) Filed: Feb. 9, 2017

(65) Prior Publication Data

US 2017/0371054 A1    Dec. 28, 2017

Related U.S. Application Data

(60) Provisional application No. 62/354,191, filed on Jun. 24, 2016.

(51) Int. Cl.
*G01V 1/28* (2006.01)

(52) U.S. Cl.
CPC ........... *G01V 1/284* (2013.01); *G01V 1/282* (2013.01); *G01V 2210/512* (2013.01)

(58) Field of Classification Search
CPC ........ G01V 1/282; G01V 1/284; G01V 1/362; G01V 1/3808; G01V 2210/512; G01V 2210/57
See application file for complete search history.

(56) References Cited

U.S. PATENT DOCUMENTS

2016/0341835 A1* 11/2016 Guillaume ............. G01V 1/303
2017/0075008 A1*  3/2017 Westerdahl ............ G01V 1/364

OTHER PUBLICATIONS

Parker, Comparison of Isotropic vs. Anisotropic PSTM Migrations in the Big Horn Basin, WY; A Thesis Presented to the Faculty of the Department of Natural Sciences and Mathematics, University of Houston (Dec. 2011) (81 pgs).
Barkved, et al., "The Many Facets of Multicomponent Seismic Data"; Oilfield Review (Summer 2004) (15 pgs) https://www.slb.com/~/media/Files/resources/oilfield_review/ors04/sum04/05_multicomponent_seismic.pdf.

* cited by examiner

*Primary Examiner* — Bryan Bui
(74) *Attorney, Agent, or Firm* — Brooks, Cameron & Huebsch, PLLC

(57) ABSTRACT

A horizontal component of marine seismic survey data from an ocean bottom seismic survey can be migrated using a primary wave velocity model. The horizontal component can comprise a shear converted wave. An image of a subsurface location can based on the migration can be produced. Migrating the horizontal component can comprise wave-equation migrating the horizontal component, where the horizontal component is input as both a source wavefield and a receiver wavefield.

20 Claims, 6 Drawing Sheets

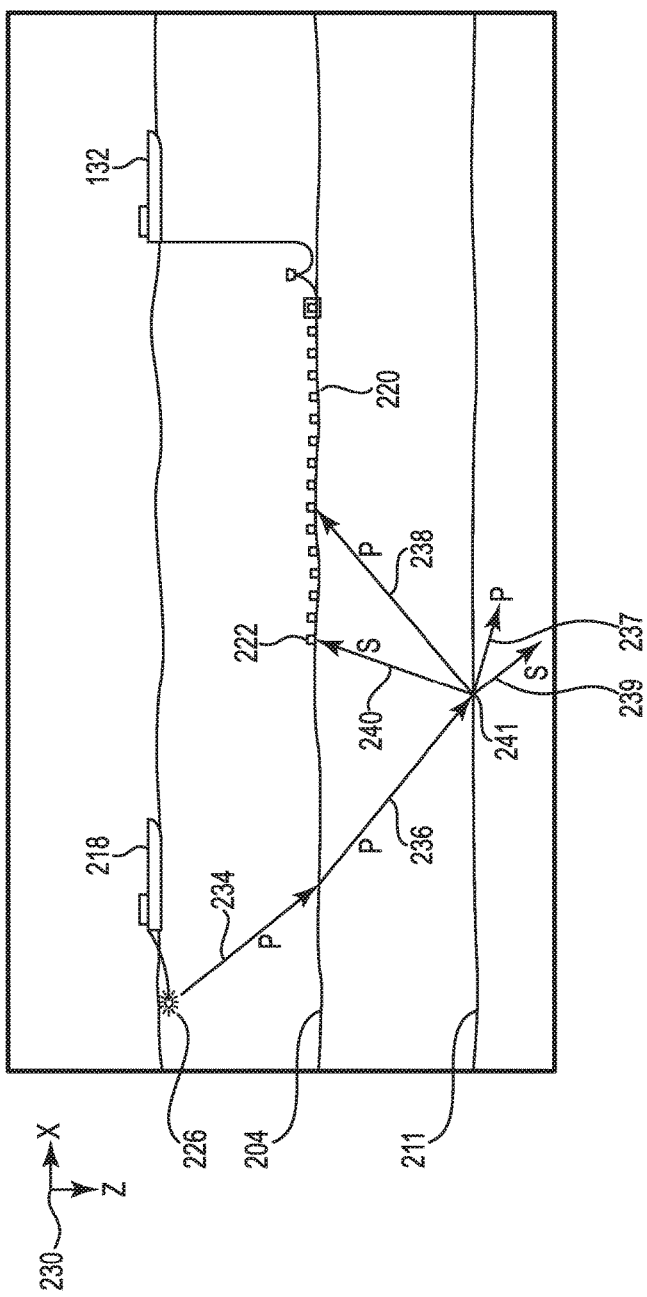
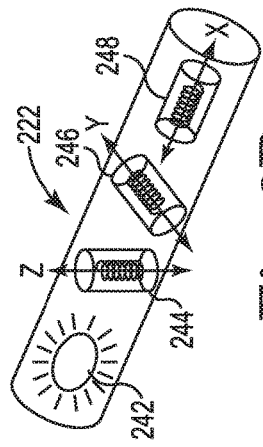
Fig. 2A
Fig. 2B

MIGRATING A HORIZONTAL COMPONENT OF MARINE SEISMIC SURVEY DATA FROM AN OCEAN BOTTOM SEISMIC SURVEY USING A PRIMARY WAVE VELOCITY MODEL, WHEREIN THE HORIZONTAL COMPONENT COMPRISES A SHEAR CONVERTED WAVE —590

PRODUCING AN IMAGE OF A SUBSURFACE LOCATION BASED ON THE MIGRATION —592

Fig. 5

MIGRATING A HORIZONTAL COMPONENT OF A WAVEFIELD

CROSS-REFERENCE TO RELATED APPLICATIONS

This application claims priority to U.S. Provisional Application 62/354,191, filed Jun. 24, 2016, which is incorporated by reference.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical ocean bottom seismic survey, a marine seismic survey vessel tows one or more sources below the water surface and over a subterranean formation to be surveyed for mineral deposits. Receivers may be located on or near the seafloor. The marine seismic survey vessel typically contains marine seismic survey equipment, such as navigation control, source control, receiver control, and recording equipment. The source control may cause the one or more sources, which can be air guns, marine vibrators, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the water surface. The receivers thereby measure a wavefield that was initiated by the actuation of the source.

BRIEF DESCRIPTION OF THE DRAWINGS

FIG. 2A illustrates an elevation or xz-plane view of ocean bottom seismic surveying in which acoustic signals are emitted by a source for recording by receivers.

FIG. 2B illustrates a detail view of a receiver for recording marine seismic survey data from an ocean bottom seismic survey.

FIG. 5 illustrates a method flow diagram for migrating a horizontal component of marine seismic survey data from an ocean bottom seismic survey.

DETAILED DESCRIPTION

Figure 1:
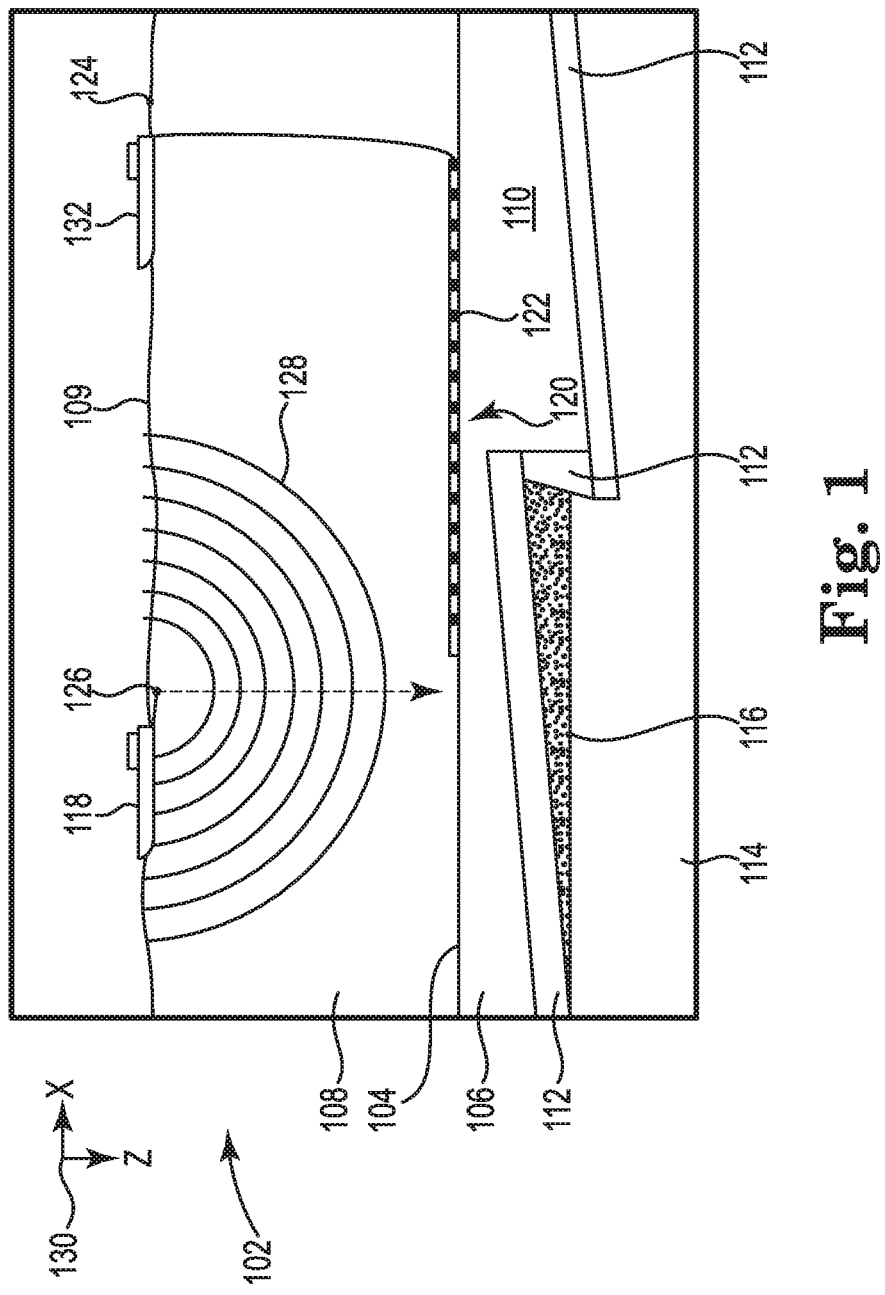
FIG. 1 illustrates an elevation or xz-plane view of marine seismic surveying in which acoustic signals are emitted by a source for recording by receivers.

This disclosure is related generally to the field of marine seismic surveying. For example, this disclosure may have applications in ocean bottom seismic surveying, in which a source is used to generate wave-fields, and ocean bottom sensors receive energy generated by the source and affected by the interaction with a subsurface formation. The sensors thereby collect marine seismic survey data, which can be useful in the discovery and/or extraction of hydrocarbons from subsurface formations.

A dual-sensor or multi-component receiver, such as the receiver 222 illustrated in FIG. 2B, can be used for an ocean bottom seismic survey. For example, a receiver comprising at least two types of sensors can measure at least two different components of a wavefield. Up-going and down-going wavefields may be separated through scaled or weighted summation of the measured components. Separating the wavefields into up- and down-going components can enable the application of techniques such as up-/down-deconvolution or Separated Wavefield Imaging (SWIM).

Marine seismic surveys may be costly. For example, a receiver array for an ocean bottom seismic survey may need to have a large number of receivers to image a subsurface location, thereby adding to the cost of the marine seismic survey. Additionally, the receivers may need to be spaced close together within the receiver array in order to image a subsurface location, thereby reducing the size of subsurface location that may be imaged. Thus, it can be beneficial to reduce the number of receivers in a receiver array to reduce costs. It is also beneficial to space the receivers within a receiver array to expand the size of the subsurface location that can be imaged.

During an ocean bottom seismic survey, horizontal components of a wavefield may be recorded, but may not be processed. This previously unused data can be used to greatly extend the recovery of a subsurface illumination from an ocean bottom seismic survey. According to at least one embodiment of the present disclosure, a horizontal component of marine seismic survey data can be migrated using a primary wave velocity model. As used herein, "velocity model" refers to a map of the subsurface indicating velocities of waves at various locations in the subsurface. The horizontal component can be a shear converted wave. As used herein, "shear converted wave" refers to a portion of a primary wave, which may also be referred to as a P-wave, which has converted into a secondary wave, which may also be referred to as an S-wave. A portion of a shear converted wave can be reflected off of a reflector. Another portion of a shear converted wave can be refracted through the subsurface. Ray-paths, which can be primary wave source-side free surface multiple modes, can be extrapolated from the horizontal component and can indicate from which shot point or image point the horizontal component originated, as a primary wave. A P-wave and a horizontal component can be used in imaging a subsurface location thereby extending the recovery of the imaging.

As a result of extending the recovery of the imaging, an ocean bottom seismic survey from which a horizontal component is migrated can be performed with a receiver array having a sparse geometry as compared to the geometry of a receiver array used in a marine seismic survey from which a horizontal component is not migrated. For example, a lesser number of receivers can be used in the receiver array or the receivers can be spaced further apart than in a receiver array used in a marine seismic survey from which a horizontal component is not migrated. This is because greater illumination of a subsurface location can be achieved from the extrapolated ray-paths, both in terms of spatial coverage and angular fold. As used herein, "spatial coverage" refers to the spatial extent of the surface area of the subsurface, such as the sea floor, that is covered by sources. Greater spatial coverage can increase the illumination that is recovered from a marine seismic survey, including but not limited to P-wave multiples. As used herein, "angular fold" refers to the diversity of P-wave multiple ray-paths that can enable the imaging of the same subsurface image point with various reflection angles. At least one embodiment includes the output of the migration being angle gathers that can be used for pre-stack data analysis, such as amplitude-versus-angle (AVA) analysis.

Noise in images of subsurface locations produced from the migration of a horizontal component can be less than approaches that do not migrate a horizontal component because the migration of a horizontal component using a primary wave velocity model intrinsically does not extrapolate receiver-side multiples, which can be a source of noise. Clear separation of recorded primary waves and S-waves can be achieved.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (having the potential to, being able to), not in a mandatory sense (must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 130 view of marine seismic surveying in which acoustic signals are emitted by a source 126 for recording by a receiver array 120. Processing and analysis of the data can be performed in order to help characterize the structures and distributions of features and materials underlying the solid surface of the earth. FIG. 1 illustrates a domain volume 102 of the earth's surface comprising a solid volume 106 of sediment and rock below the solid surface 104 of the earth that, in turn, underlies a fluid volume 108 of water having a water surface 109 such as in an ocean, an inlet or bay, or a large freshwater lake. The domain volume 102 shown in FIG. 1 represents an example experimental domain for a class of marine seismic surveys, such as marine seismic surveys. FIG. 1 illustrates a first sediment layer 110, an uplifted rock layer 112, second, underlying rock layer 114, and hydrocarbon-saturated layer 116. One or more elements of the solid volume 106, such as the first sediment layer 110 and the first uplifted rock layer 112, can be an overburden for the hydrocarbon-saturated layer 116. In some instances, the overburden may include salt.

FIG. 1 illustrates an example of a marine seismic survey vessel 118 and a marine seismic recording vessel 132 equipped to carry out marine seismic surveys. In particular, the marine seismic recording vessel 132 can be coupled to the receiver array 120 located on the solid surface 104, which can be the seafloor. However, in at least one embodiment, the receiver array 120 is not directly coupled to the seismic recording vessel 132. The receiver 122 is one of the receivers of the receiver array 120. For example, the receiver array 120 may be located on ocean bottom cables or nodes fixed at or near the solid surface 104, and sources 126 may also be disposed in a nearly-fixed or fixed configuration. The receiver array 120 can be coupled to the marine seismic recording vessel 132 by long cables containing power and data-transmission lines (electrical, optical fiber, etc.). Examples of sources 126 include air guns and marine vibrators, among others.

The receiver array 120, the marine seismic survey vessel 118, and the marine seismic recording vessel 132 can include sophisticated sensing electronics and data-processing facilities that allow receiver readings to be correlated with absolute positions on the water surface and absolute three-dimensional positions with respect to a three-dimensional coordinate system. In at least one embodiment, the receiver array 120 can be coupled to the marine seismic survey vessel 118 such that the marine seismic recording vessel 132 may not be necessary. In at least one embodiment, the receiver array 120 may not be coupled to any vessels. The marine seismic survey vessel 118 can tow one or more sources 126 that produce acoustic signals as the marine seismic survey vessel 118 moves across the water surface 109. Sources 126 may be otherwise disposed in fluid volume 108.

FIG. 1 illustrates an expanding, spherical acoustic signal, illustrated as semicircles of increasing radius centered at the source 126, representing a down-going wavefield 128, following an acoustic signal emitted by the source 126. The down-going wavefield 128 is, in effect, shown in a vertical plane cross section in FIG. 1. The outward and downward expanding down-going wavefield 128 may eventually reach the solid surface 104, at which point the outward and downward expanding down-going wavefield 128 may partially scatter, may partially reflect back toward the receiver array 120, and may partially refract downward into the solid volume 106, becoming elastic signals within the solid volume 106.

FIG. 2A illustrates an elevation or xz-plane 230 view of ocean bottom seismic surveying in which acoustic signals are emitted by a source 226 for recording by receivers 220. A wavefield, such as the down-going wavefield 128 illustrated in FIG. 1, can comprise P-waves. In P-waves, particle motion is parallel to the direction of wave propagation. In contrast to P-waves, in S-waves particle motion is perpendicular to the direction of wave propagation. Because the particle motion is parallel to the propagation of a P-wave, it can be referred to as a vertical component of marine seismic survey data. Similarly, because the particle motion is perpendicular to the propagation of an S-wave, it can be referred to as a horizontal component of marine seismic survey data. Although P-waves can propagate in both solids and fluids, S-waves can only propagate in solids. Thus, to record S-waves receivers should be in close proximity to or in contact with the solid surface 204.

As illustrated in FIG. 2A, the source 226, which can be analogous to the source 126 illustrated in FIG. 1, can emit a P-wave, represented by a ray-path 234. When the P-wave reaches the solid surface 204, the angle at which the P-wave propagates changes as illustrated by the ray-path 236. When the P-wave reaches the subsurface reflector 211 underlying the solid surface 204, the P-wave can be reflected at the subsurface location 241 such that the angle of reflection equals the angle of incidence as shown by the ray-paths 236 and 238. When the P-wave reaches the subsurface reflector 211, the P-wave can also undergo a partial conversion to an S-wave. A recorded wave that starts as P-waves and converts to S-wave can be referred to as a shear converted wave. As illustrated in FIG. 2, the angle of reflection of the shear converted wave does not equal the angle of incidence (compare the ray-path 240 to the ray-path 236). This difference in the angles of reflection and incidence occurs because the propagation velocity of the shear converted wave is less than the propagation velocity of the P-wave. This asymmetry may complicate acquisition and processing of shear converted waves. FIG. 2A also shows portions of the P-wave that refracted through the subsurface reflector 211. After the P-wave refracts through the subsurface reflector 211, a portion of the P-wave is transmitted as a P-wave represented by ray-path 237 and a portion of the P-wave is converted to an S-wave and transmitted as represented by the ray-path 239. The transmitted portions of the refracted P-wave have altered angles as shown by the ray-paths 237 and 239 in comparison to the ray-path 236.

FIG. 2B illustrates a detail view of a receiver 222 for recording marine seismic survey data from an ocean bottom seismic survey. The receiver 222 can be any one of the receivers in the receiver array 220 and can be analogous to the receiver 122 illustrated in FIG. 1. The receiver 222 can comprise a pressure sensor, such as a hydrophone, and orthogonally oriented particle motion sensors. The particle motion sensors can be geophones or accelerometers. For example, as illustrated in FIG. 2B, the receiver 222 can comprise a hydrophone 242, a particle motion sensor oriented in the z-direction 244, a particle motion sensor oriented in the y-direction 246, and a particle motion sensor oriented in the x-direction 248. The orthogonal orientation of the particle motion sensors allows detection of shear converted waves in all possible directions.

Figure 3:
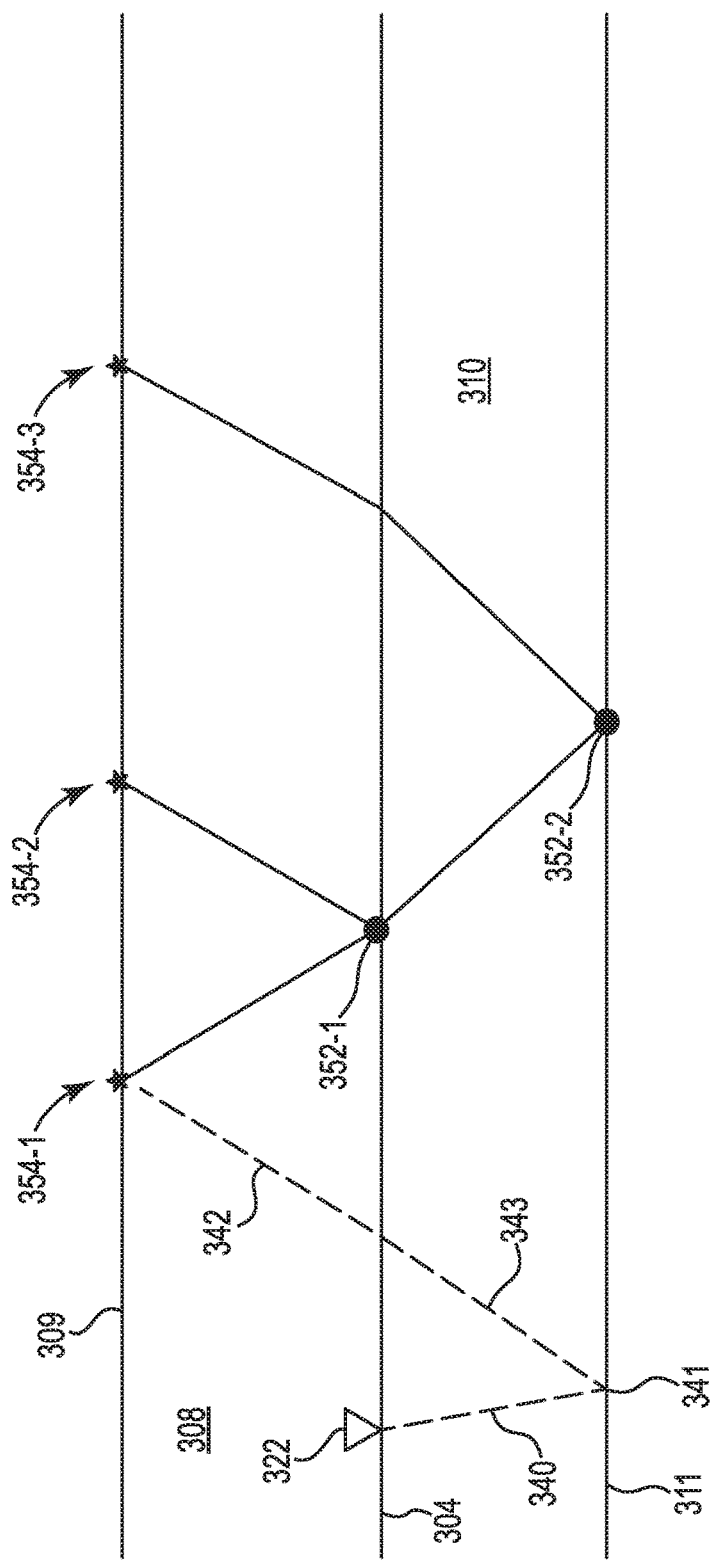
FIG. 3 illustrates results from a migration of a horizontal component of marine seismic survey data from an ocean bottom seismic survey.

FIG. 3 illustrates results from a migration of a horizontal component of marine seismic survey data from an ocean bottom seismic survey. As used herein, "migrating" refers to a process by which seismic events are geometrically relocated in either space or time to the position that the seismic events occurred rather than the position that the seismic events were recorded (which can be referred to as an image point). A horizontal component of marine seismic survey data can be a shear converted wave that can be recorded by a receiver. The receiver 322 can be analogous to the receiver 222 illustrated in FIGS. 2A and 2B.

FIG. 3 illustrates a shear converted wave that propagated from a subsurface reflector 311 to the receiver 322 as shown by ray-path 340. The dashed ray-paths 340, 343, and 342 represent the propagation of a P-wave; however, the dashed ray-paths 340, 343, and 342 are not used in the migration. As discussed above, a shear converted wave originates from a P-wave. In this example, the shear converted wave originated from a P-wave that propagated through the fluid volume 308 and the first sediment layer 310 before being converted to an S-wave after reflecting off of the subsurface reflector 311 at the reflection point 341. In some approaches, the horizontal component of marine seismic survey data may not be fully utilized. A horizontal component of marine seismic survey data can be used to extrapolate ray-paths, which can be primary wave source-side free surface multiple modes, that can indicate from which shot point or image point the horizontal component originated.

A ray-path can be extrapolated from a horizontal component of an up-going receiver-side ray-path of marine seismic survey data from an ocean bottom seismic survey. An extrapolated ray-path can be deconvolved to determine an image point. The dashed ray-paths 340 and 343 in FIG. 3 represent data that is removed in the deconvolution process such that the migration stops at the shot point 354-1. As used herein, "deconvolution" refers to reversing the effects of convolution on recorded data, where convolution assumes that the recorded data is a combination of a reflectivity function and a source wavefield from a source. The solid ray-paths represent results of the migration of the horizontal component. In some approaches where the data represented by the dashed ray-paths 340 and 343 is not removed, there may be another ray-path (not shown), corresponding to a P-wave, departing upward from the receiver 322 that can interfere with other ray-paths. The interference may be direct interference, such as with the ray-path 343, or after the ray-path (not shown) departing upward from the receiver 322 reflects off of the water surface 309 thereby adding noise to an image of a subsurface location.

As used herein, "down-going" refers to going from a shallow depth to a deeper depth. Conversely, "up-going" refers to going from a deep depth to a shallower depth. Referring to FIG. 3, a wave propagating from the shot point 354-2 to the image point 352-1 can be referred to as following a down-going source-side ray-path whereas a wave propagating from the reflection point 341 to the receiver 322 can be referred to as following an up-going receiver-side ray-path.

FIG. 3 shows a number of results from the migration of the horizontal component. For example, a first result of the migration is that a P-wave originated from a source located at the shot point 354-2, reflected off of the solid surface 304 at the image point 352-1 corresponding to the pair of shot points 354-1 and 354-2. Although not included in the migration to contribute to the image of the subsurface location, the dashed ray-paths 342, 343, and 340 represent the remaining propagation of the P-wave originating from the shot point 354-2 to being received as a shear converted wave by the receiver 322.

A second result of the migration is that a P-wave originated from a source located at the shot point 354-3, refracted through the solid surface 304, reflected off of the subsurface reflector 311 at the image point 352-2 corresponding to the pair of shot points 354-1 and 354-3 Although not included in the migration to contribute to the image of the subsurface location, the dashed ray-paths 342, 343, and 340 represent the remaining propagation of the P-wave originating from the shot point 354-3 to being received as a shear converted wave by the receiver 322.

As illustrated in FIG. 3, the shot points (collectively referred to as shot points 354) can be the position of a source, such as the source 126 illustrated in FIG. 1. In FIG. 3, the shot points 354 are illustrated at the water surface 309 for ease of illustration. However, embodiments are not limited to shot points 354 being located at the water surface 309. As illustrated in FIGS. 1 and 2A, a source can be located close to or below the water surface 309 at a position corresponding to a shot point 354. After migrating the horizontal component, the results of the migration can be used with a number of imaging processes.

Marine seismic survey data can comprise a plurality of shot point traces, to which the migration can be applied. The migration can be applied to a common receiver gather. As used herein, "common receiver gather" refers to a plurality of shot point traces recorded at a single receiver position (such as the receiver 322), where each shot point trace represents the detection of a wavefield emitted by a source at a particular position. The results of the migration of a common receiver gather can be referred to as a common image receiver gather. With respect to the example migration illustrated in FIG. 3, each result can be an image trace from one of the image points (collectively referred to as image points 352). At least one embodiment can include a plurality of receivers such that there can be overlap between the common receiver image gathers. As a result, image traces from multiple common image receiver gathers of the same image point 352 can be summed to generate a direct stack image.

Figure 4:
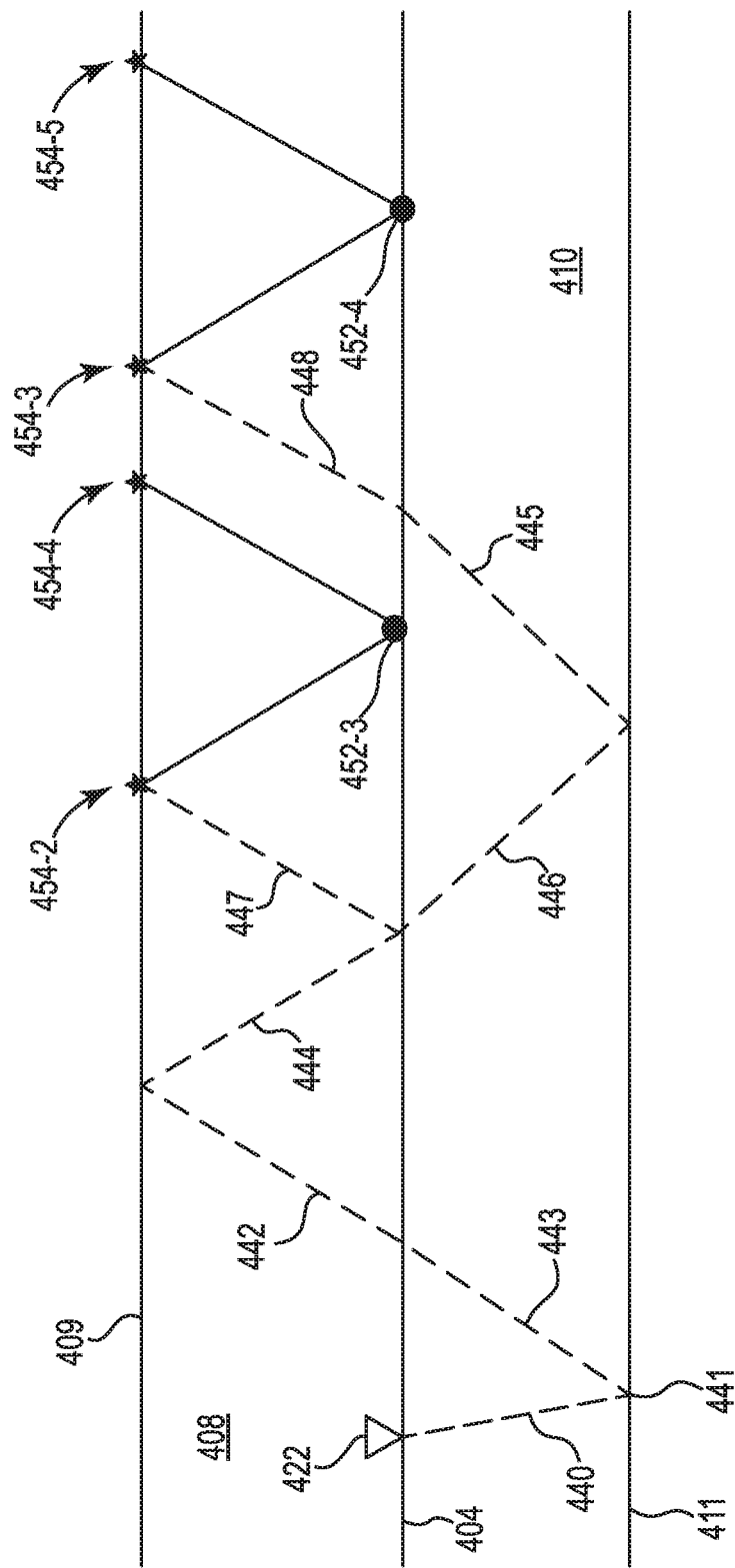
FIG. 4 illustrates results from a migration of a horizontal component of marine seismic survey data from an ocean bottom seismic survey.

FIG. 4 illustrates results from a migration of a horizontal component of marine seismic survey data from an ocean bottom seismic survey. A horizontal component of marine seismic survey data can be a shear converted wave that can be recorded by a receiver. The receiver 422 can be analogous to the receiver 222 illustrated in FIGS. 2A and 2B.

FIG. 4 illustrates a shear converted wave that propagated from a subsurface reflector 411 to the receiver 422 as shown by the dashed ray-path 440. The dashed ray-paths 442, 443, 444, 445, 446, 447, and 448 represent the propagation of a P-wave; however, the dashed ray-paths 442, 443, 444, 445, 446, 447, and 448 are not used in the migration. As discussed above, a shear converted wave originates from a P-wave. In this example, the shear converted wave originated from a P-wave that propagated through the fluid volume 408 and the first sediment layer 410 before being converted to an S-wave after reflecting off of the subsurface reflector 411 at the reflection point 441. In some approaches, the horizontal component of marine seismic survey data may not be fully utilized. A horizontal component of marine seismic survey data can be used to extrapolate ray-paths, which can be primary wave source-side free surface multiple modes, that can indicate from which shot point or image point the horizontal component originated.

A ray-path can be extrapolated from a horizontal component of an up-going receiver-side ray-path of marine seismic survey data from an ocean bottom seismic survey. An extrapolated ray-path can be deconvolved to determine an image point. A subsurface location can be imaged using the image points. The dashed ray-paths 440, 443, 442, 444, 447, 446, 445, and 448 in FIG. 4 represent data that is removed in the deconvolution process such that the migration stops at the shot point 454-2 or 454-3. The solid ray-paths represent results of the migration of the horizontal component. In some approaches where the data represented by the dashed ray-paths 440, 443, and 445 is not removed, there may be another ray-path (not shown), corresponding to a P-wave, departing upward from the receiver 422 that can interfere with other ray-paths. The inference may be direct interference, such as with the ray-path 443, or after the ray-path (not shown) departing upward from the receiver 422 reflects off of the water surface 409 thereby adding noise to an image of a subsurface location.

FIG. 4 shows a number of results from the migration of the horizontal component. A first result of the migration is that a P-wave originated from a source at the shot point 454-4, reflected off of the solid surface 404 at the image point 452-3 corresponding to the pair of shot points 454-2 and 454-4. Although not included in the migration to contribute to the image of the subsurface location, the dashed ray-paths 447, 444, 442, 443, and 440 represent the remaining propagation of the P-wave originating from the shot point 454-4 to being received as a shear converted wave by the receiver 422.

A second result of the migration is that a P-wave originated from a source located at the shot point 454-5, reflected off of the solid surface 404 at the image point 452-4 corresponding to the pair of shot points 454-3 and 454-5. Although not included in the migration to contribute to the image of the subsurface location, the dashed ray-paths 448, 445, 446, 444, 442, 443, and 440 represent the remaining propagation of the P-wave originating from the shot point 454-5 to being received as a shear converted wave by the receiver 422.

As illustrated in FIG. 4, the shot points 454 can be the position of a source, such as the source 126 illustrated in FIG. 1. As illustrated in FIGS. 1 and 2A, a source can be located close to or below the water surface 409 at a position corresponding to a shot point 454. After migrating the horizontal component, the results of the migration can be used with a number of imaging processes.

Marine seismic survey data can comprise a plurality of shot point traces, to which the migration can be applied. The migration can be applied to a common receiver gather. As used herein, "common receiver gather" refers to a plurality of shot point traces recorded at a single receiver position (such as the receiver 422), where each shot point trace represents the detection of a wavefield emitted by a source at a particular position. The results of the migration of a common receiver gather can be referred to as a common image receiver gather. With respect to the example migration illustrated in FIG. 4, each result can be an image trace from one of the image points 452. At least one embodiment can include a plurality of receivers such that there can be overlap between the common receiver image gathers. As a result, image traces from multiple common image receiver gathers of the same image point 452 can be summed to generate a direct stack image.

In contrast to the common receiver gather example illustrated in FIGS. 3 and 4, in at least one embodiment, image traces from migrating a horizontal component can be reconstructed for various reflection angles to generate an angle gather. A receiver may be used as a modeled source, resulting in the providing of a data set that has coverage of zero- and near-offset ranges under a seismic spread. In particular, examples may provide near-offset range data for shallow targets that are not sampled by primaries, enabling amplitude-versus-angle (AVA) analysis to be carried out. As used herein, AVA is interchangeable with amplitude versus offset (AVO). AVA analysis is a technique that can be executed on seismic data to determine properties of a subsurface location, such as fluid content, porosity, density, seismic velocity, shear wave information, fluid indicators, etc. The AVA results may be used to derive a direct hydrocarbon indicator (DHI) that may otherwise be impossible to achieve using primaries alone. A DHI is a seismic attribute found via reflection seismology that indicates the presence of hydrocarbons in a reservoir. AVA can be used with an angle gather where the plurality of shot point traces are recorded by more than one receiver, such as a receiver array.

At least one embodiment includes a source and a plurality of receivers imaging a single subsurface location from an angle gather. The distance between the source and each one of the plurality of receivers can be referred to as an offset. Each of the offsets correspond to the angle at which a wave (for example, a P-wave) reflects off of a reflector at the subsurface location. These offsets can be used be to update a primary wave velocity model. Updating the primary wave velocity model can improve the quality of images produced from a subsequent migration of a horizontal component using the updated primary wave velocity model. Each of the possible results of migrating a horizontal component is illustrated as a ray-path, which can be separately mapped according to subsurface incidence angles. For example, each of the possible results illustrated in FIGS. 3 and 4 can be separately mapped according to the subsurface incidence angles at the image points 352 and 452. A pre-stack image, in an angle domain and based on the mapping, can be output from the migration.

FIG. 5 illustrates a method flow diagram for migrating a horizontal component of marine seismic survey data from an ocean bottom seismic survey. At block 590, the method can include migrating a horizontal component of marine seismic survey data from an ocean bottom seismic survey using a primary wave velocity model. The horizontal component can comprise a shear converted wave. Migrating the horizontal component can comprise wave-equation migrating the horizontal component, where the horizontal component is input as both a source wavefield and a receiver wavefield. As used herein, "source wavefield" refers to pressure and particle motion variation as a function of time and position caused by an acoustic signal from a source or modeled as being emitted by a modeled source. As used herein, "receiver wavefield" refers to pressure and particle motion variation as a function of time and position measured by a receiver or modeled as being received by a modeled receiver. The horizontal component can be isotropically or anisotropically migrated. Migrating the horizontal component can comprise applying a deconvolution imaging condition to the horizontal component. Applying the deconvolution imaging condition can comprise using the shear converted wave. Migrating the horizontal component can comprise applying a cross-correlation imaging condition to the horizontal component in response to a signal-to-noise ratio being below a threshold. As used herein, "a cross-correlation imaging condition" is a measure of similarity between two waveforms as a function of a time lag applied to one of the waveforms.

At block 592, the method can include producing an image of a subsurface location based on the migration. A plurality of shot point traces of the marine seismic survey data for a particular image point of the subsurface location can be summed. At least one embodiment can include a plurality of receivers such that there can be overlap between the common receiver image gathers. As a result, image traces from multiple common image receiver gathers of the same image point can be summed to generate a direct stack image. The method can include separately mapping a plurality of ray-paths based on the migration according to subsurface incidence angles of the plurality of ray-paths. The method can include outputting a pre-stack image in an angle domain based on the mapping.

An ocean bottom seismic survey can performed and include recording the horizontal component with a horizontal particle motion sensor, an accelerometer, or a geophone. Marine seismic survey data can be received from a third party that performed an ocean bottom seismic survey. Horizontal components can be processed through a noise reduction program or rotation program to modify the recorded energy distribution between two orthogonal horizontal components.

Figure 6:
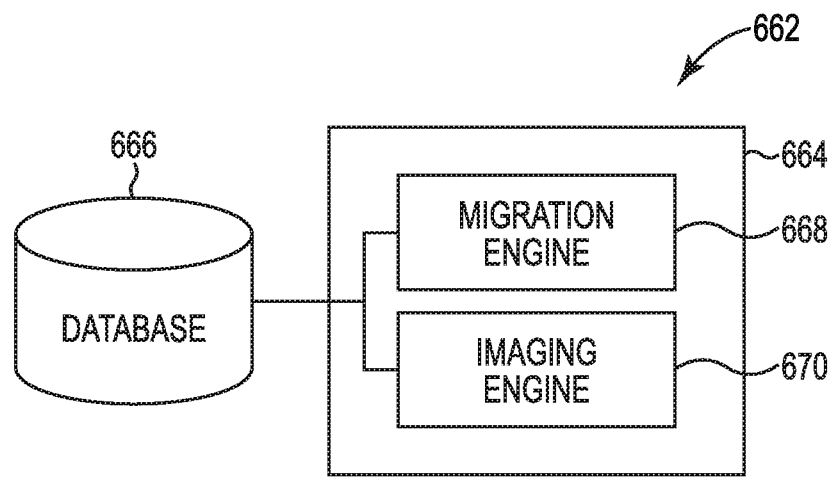
FIG. 6 illustrates a diagram of a system for migrating a horizontal component of marine seismic survey data from an ocean bottom seismic survey.

FIG. 6 illustrates a diagram of a system 662 for migrating a horizontal component of marine seismic survey data from an ocean bottom seismic survey. The system 662 can include a data store 666, a subsystem 664, and a number of engines, such as a migration engine 668 and an imaging engine 670. The subsystem 664 and engines can be in communication with the data store 666 via a communication link. The system 662 can include additional or fewer engines than illustrated to perform the various functions described herein. The system can represent program instructions and/or hardware of a machine such as the machine 774 referenced in FIG. 7, etc. As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic. Hard-wired program instructions can be considered as both program instructions and hardware.

The migration engine 668 can include a combination of hardware and program instructions that are configured to apply a wave-equation migration to a horizontal component of the marine seismic survey data to extrapolate ray-paths. The horizontal component can comprise a shear converted wave resulting from an activation of at least one source. The extrapolated ray-paths can comprise associated source-side surface reflection multiple waves.

The imaging engine 670 can include a combination of hardware and program instructions that is configured to separately map a plurality of ray-paths leading to the horizontal component based on the migration according to subsurface incidence angles of the plurality of ray-paths, and output a pre-stack image in an angle domain based on the mapping. The imaging engine 670 can be further configured to perform an angle versus offset (AVO) analysis of the plurality of ray-paths. The imaging engine 670 can be further configured to update a primary wave velocity model based on offsets of an angle gather.

Figure 7:
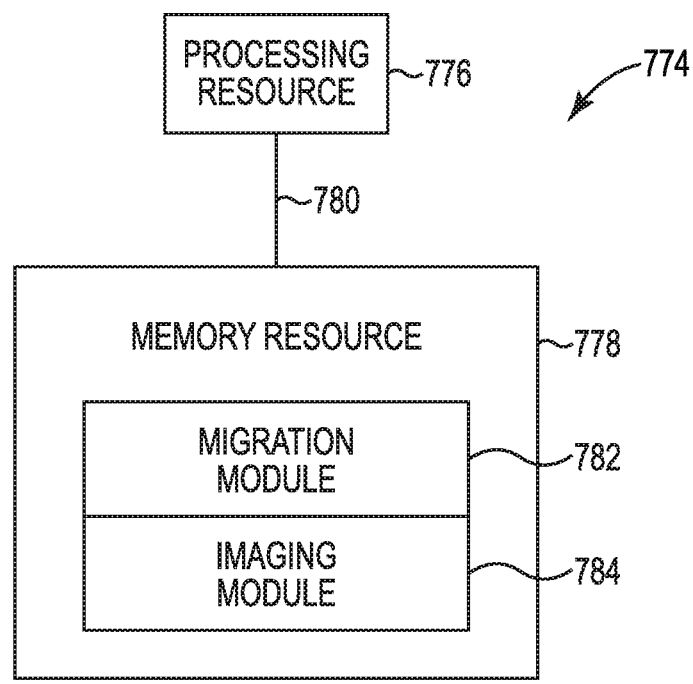
FIG. 7 illustrates a diagram of a machine for migrating a horizontal component of marine seismic survey data from an ocean bottom seismic survey.

FIG. 7 illustrates a diagram of a machine 774 for migrating a horizontal component of marine seismic survey data from an ocean bottom seismic survey. The machine 774 can utilize software, hardware, firmware, and/or logic to perform a number of functions. The machine 774 can be a combination of hardware and program instructions configured to perform a number of functions. The hardware, for example, can include a number of processing resources 776 and a number of memory resources 778, such as a machine-readable medium or other non-transitory memory resources 778. The memory resources 778 can be internal and/or external to the machine 774, for example, the machine 774 can include internal memory resources and have access to external memory resources. The program instructions, such as machine-readable instructions, can include instructions stored on the machine-readable medium to implement a particular function, for example, an action such as applying a wave-equation migration to a horizontal component of marine seismic survey data to extrapolate ray-paths. The set of machine-readable instructions can be executable by one or more of the processing resources 776. The memory resources 778 can be coupled to the machine 774 in a wired and/or wireless manner. For example, the memory resources 778 can be an internal memory, a portable memory, a portable disk, or a memory associated with another resource, for example, enabling machine-readable instructions to be transferred and/or executed across a network such as the Internet. As used herein, a "module" can include program instructions and/or hardware, but at least includes program instructions.

Memory resources 778 can be non-transitory and can include volatile and/or non-volatile memory. Volatile memory can include memory that depends upon power to store data, such as various types of dynamic random access memory among others. Non-volatile memory can include memory that does not depend upon power to store data. Examples of non-volatile memory can include solid state media such as flash memory, electrically erasable programmable read-only memory, phase change random access memory, magnetic memory, optical memory, and a solid state drive, etc., as well as other types of non-transitory machine-readable media.

The processing resources 776 can be coupled to the memory resources 778 via a communication path 780. The communication path 780 can be local or remote to the machine 774. Examples of a local communication path 780 can include an electronic bus internal to a machine, where the memory resources 778 are in communication with the processing resources 776 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 780 can be such that the memory resources 778 are remote from the processing resources 776, such as in a network connection between the memory resources 778 and the processing resources 776. That is, the communication path 780 can be a network connection. Examples of such a network connection can include a local area network, wide area network, personal area network, and the Internet, among others.

As shown in FIG. 7, the machine-readable instructions stored in the memory resources 778 can be segmented into a number of modules 782 and 784 that when executed by the processing resources 776 can perform a number of functions. As used herein a module includes a set of instructions included to perform a particular task or action. The number of modules 782 and 784 can be sub-modules of other modules. For example, the imaging module 784 can be a sub-module of the migration module 782, and the migration module 782 and the imaging module 788 can be contained within a single module. Furthermore, the number of modules 782 and 784 can comprise individual modules separate and distinct from one another. Examples are not limited to the specific modules 782 and 784 illustrated in FIG. 7.

Each of the number of modules 782 and 784 can include program instructions or a combination of hardware and program instructions that, when executed by a processing resource 776, can function as a corresponding engine as described with respect to FIG. 6. For example, the migration module 782 can include program instructions or a combination of hardware and program instructions that, when executed by a processing resource 776, can function as the migration engine 668. The imaging module 784 can include program instructions or a combination of hardware and program instructions that, when executed by a processing resource 776, can function as the imaging engine 670.

In accordance with a number of embodiments of the present disclosure, a geophysical data product may be produced. The geophysical data product may include, for example, a horizontal component of marine seismic survey data from an ocean bottom seismic survey. Geophysical data may be obtained and stored on a non-transitory, tangible computer-readable medium. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. For example, horizontal components of marine seismic survey data from an ocean bottom seismic survey can be migrated using a primary wave velocity model to image a subsurface location. The horizontal components can comprise a shear converted wave. As another example, the migration can be performed directly from seismic data offshore to facilitate other processing of the acquired marine seismic survey measurement either offshore or onshore.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   migrating, by a processing resource, a horizontal component of marine seismic survey data from an ocean bottom seismic receiver using a primary wave velocity model, wherein the horizontal component comprises a secondary wave partially converted from a primary wave originating from a first shot point;
   extrapolating, by the processing resource and based on the migrated horizontal component, a ray-path of a primary wave originating from a second shot point that is further away from the ocean bottom seismic receiver than the first shot point; and
   producing, by the processing resource, an image of a subsurface location including an image point on the extrapolated ray-path.

2. The method of claim 1, wherein migrating the horizontal component comprises wave-equation migrating the horizontal component, and
   wherein the horizontal component is input as both a source wavefield and a receiver wavefield.

3. The method of claim 2, wherein wave-equation migrating the horizontal component comprises isotropically migrating the horizontal component.

4. The method of claim 2, wherein wave-equation migrating the horizontal component comprises anisotropically migrating the horizontal component.

5. The method of claim 1, wherein the marine seismic survey data comprise a plurality of shot point traces comprising a common receiver gather, and
wherein producing the image of the subsurface location comprises:
summing a plurality of image traces for a particular image point of the subsurface location; and
outputting a direct stack image based on the summed plurality of image traces.

6. The method of claim 1, wherein producing the image of the subsurface location comprises:
separately mapping a plurality of ray-paths based on the migration according to subsurface incidence angles of the plurality of ray-paths; and
outputting a pre-stack image in an angle domain based on the mapping.

7. The method of claim 1, wherein migrating the horizontal component comprises applying a deconvolution imaging condition to the horizontal component, and
wherein applying the deconvolution imaging condition comprises using the shear converted wave.

8. The method of claim 1, wherein migrating the horizontal component comprises applying a cross-correlation imaging condition to the horizontal component in response to a signal-to-noise ratio being below a threshold.

9. The method of claim 1, further comprising performing an ocean bottom seismic survey including recording the horizontal component with a horizontal particle motion sensor.

10. The method of claim 1, further comprising performing an ocean bottom seismic survey including recording the horizontal component with an accelerometer or a geophone.

11. The method of claim 1, further comprising receiving the marine seismic survey data from a third party that performed the ocean bottom seismic survey.

12. A system, comprising:
marine seismic survey data from an ocean bottom seismic survey;
a migration engine configured to apply a wave-equation migration to a horizontal component of the marine seismic survey data to extrapolate ray-paths,
wherein the horizontal component comprises a shear converted wave resulting from an activation of at least one source; and
an imaging engine configured to:
separately map ray-paths extrapolated from the migration of the horizontal component according to subsurface incidence angles of the extrapolated ray-paths,
wherein the extrapolated ray-paths include an image point corresponding to the activation of the at least one source and an extrapolated shot point; and
output a pre-stack image in an angle domain based on the mapping.

13. The system of claim 12, wherein the extrapolated ray-paths comprise associated source-side surface reflection multiple waves.

14. The system of claim 12, wherein the imaging engine is further configured to perform an amplitude-versus-angle (AVA) analysis of the extrapolated ray-paths.

15. The system of claim 12, wherein the imaging engine is further configured to update a primary wave velocity model based on offsets of an angle gather.

16. A non-transitory machine-readable medium storing instructions executable by a processing resource to:
cause the processing resource to:
migrating a horizontal component of marine seismic survey data from an ocean bottom seismic receiver using a primary wave velocity model, wherein the horizontal component comprises a secondary wave partially converted from a primary wave;
extrapolate ray-paths from the horizontal component of an up-going receiver-side ray-path of the marine seismic survey data,
wherein the extrapolated ray-paths include an image point at a distance, in an x-direction, away from a location on a subsurface reflector at which the primary wave converts into the secondary wave; and
generate an image of a subsurface location based on the extrapolated ray-paths.

17. The medium of claim 16, further comprising instructions executable to cause the processing the processing resource to deconvolve the extrapolated ray-paths to determine the image point.

18. The medium of claim 17, further comprising instructions executable to cause the processing the processing resource to generate the image of the subsurface location using the image point.

19. A method to manufacture a geophysical data product, the method comprising:
obtaining, by a machine, geophysical data; and
processing, by the machine, the geophysical data to generate the geophysical data product, wherein processing the geophysical data comprises:
migrating horizontal components of marine seismic survey data from an ocean bottom seismic survey using a primary wave velocity model to image a subsurface location, wherein the horizontal components comprise a secondary wave partially converted from a primary wave originating from a first shot point; and
extrapolating, by the processing resource and based on the migrated horizontal component, a ray-path of a primary wave originating from a second shot point that is further away from the ocean bottom seismic receiver than the first shot point; and
recording the geophysical data product on a non-transitory machine-readable medium.

20. The method of claim 19, wherein processing the geophysical data comprises processing the geophysical data offshore or onshore.

* * * * *